United States Patent [19]
McMurtrie

[11] Patent Number: 5,922,227
[45] Date of Patent: Jul. 13, 1999

[54] PORTABLE LOW WATTAGE ELECTRIC HEATER

[76] Inventor: Dallas McMurtrie, 1779 N. Union Church Rd., Veedersburg, Ind. 47987

[21] Appl. No.: 08/660,579

[22] Filed: Jun. 11, 1996

Related U.S. Application Data

[63] Continuation-in-part of application No. 08/402,940, Mar. 13, 1995.

[51] Int. Cl.$^6$ .............................. H05B 1/00; G01J 1/00; F21V 33/00
[52] U.S. Cl. ....................... 219/220; 219/240; 250/495.1; 362/92; 362/95
[58] Field of Search .................................. 219/240, 241, 219/507, 385, 520, 522, 386, 387, 220; 392/407, 411, 416; 250/495.1; 313/15; 362/92, 95

[56] References Cited

U.S. PATENT DOCUMENTS

| | | |
|---|---|---|
| 2,831,951 | 4/1958 | Desloge . |
| 3,440,396 | 4/1969 | Greene, Jr. . |
| 3,558,855 | 1/1971 | Stanek . |
| 3,624,346 | 11/1971 | Guth . |
| 3,786,233 | 1/1974 | Bumpus et al. . |
| 3,808,401 | 4/1974 | Wright ..................................... 219/521 |
| 3,909,589 | 9/1975 | Stone et al. . |
| 3,958,100 | 5/1976 | Stone . |
| 4,084,572 | 4/1978 | Schetti ................................... 126/200 |
| 4,267,430 | 5/1981 | Downey ................................. 219/222 |
| 4,273,992 | 6/1981 | Thomas . |
| 4,370,130 | 1/1983 | Berger .................................... 219/241 |
| 4,398,083 | 8/1983 | Mack ...................................... 219/240 |
| 5,132,518 | 7/1992 | Solacoff . |
| 5,375,511 | 12/1994 | Huie ....................................... 219/405 |

*Primary Examiner*—Teresa Walberg
*Assistant Examiner*—Daniel L. Robinson
*Attorney, Agent, or Firm*—Burns, Doane, Swecker & Mathis, L.L.P.

[57] ABSTRACT

A portable electric heater which can be used with different power supplies and can also be used as a lamp. The heater includes a compact housing having a top panel and a bottom panel and at least two removable heating elements mounted within the housing. The heater may be connected to different electrical power supplies having different voltages. A switch is provided to connect one or the other of the two heating elements to the electrical power supply, depending on the voltage of the power supply. An adjustable thermostat is provided to turn off the heating elements to prevent the heater from overheating. The heating elements may be light bulbs in which case the heater also includes a sliding door which may be opened in order to use the heater as a lamp.

15 Claims, 4 Drawing Sheets

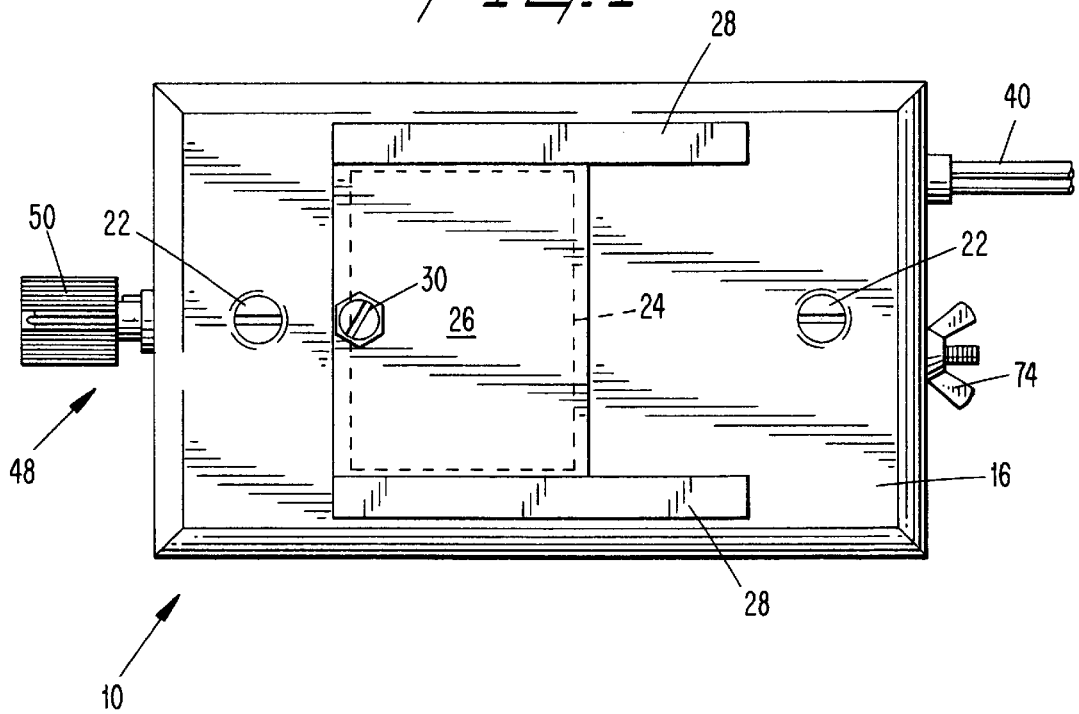
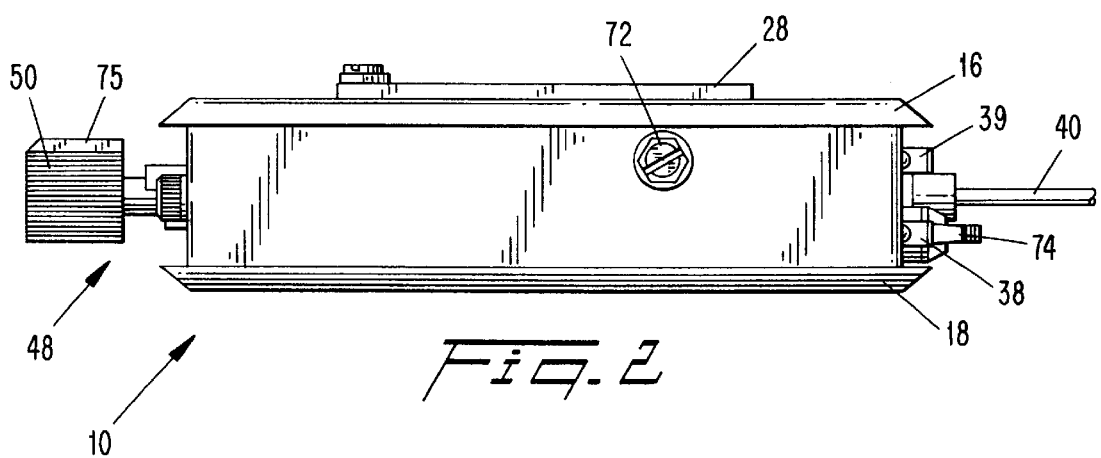

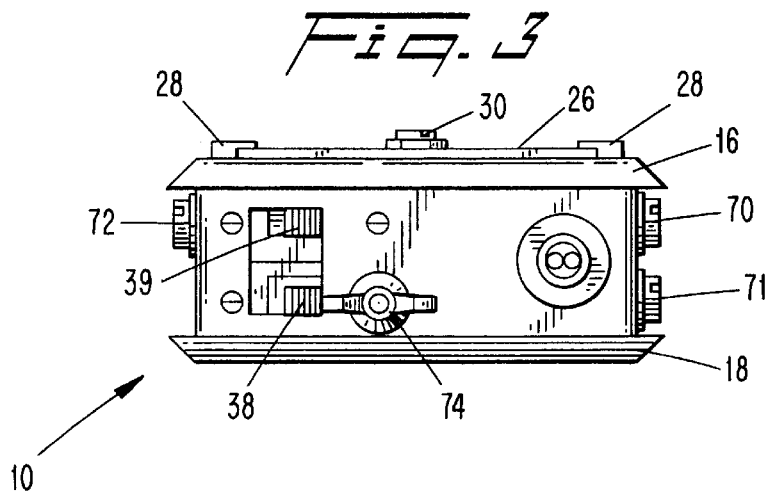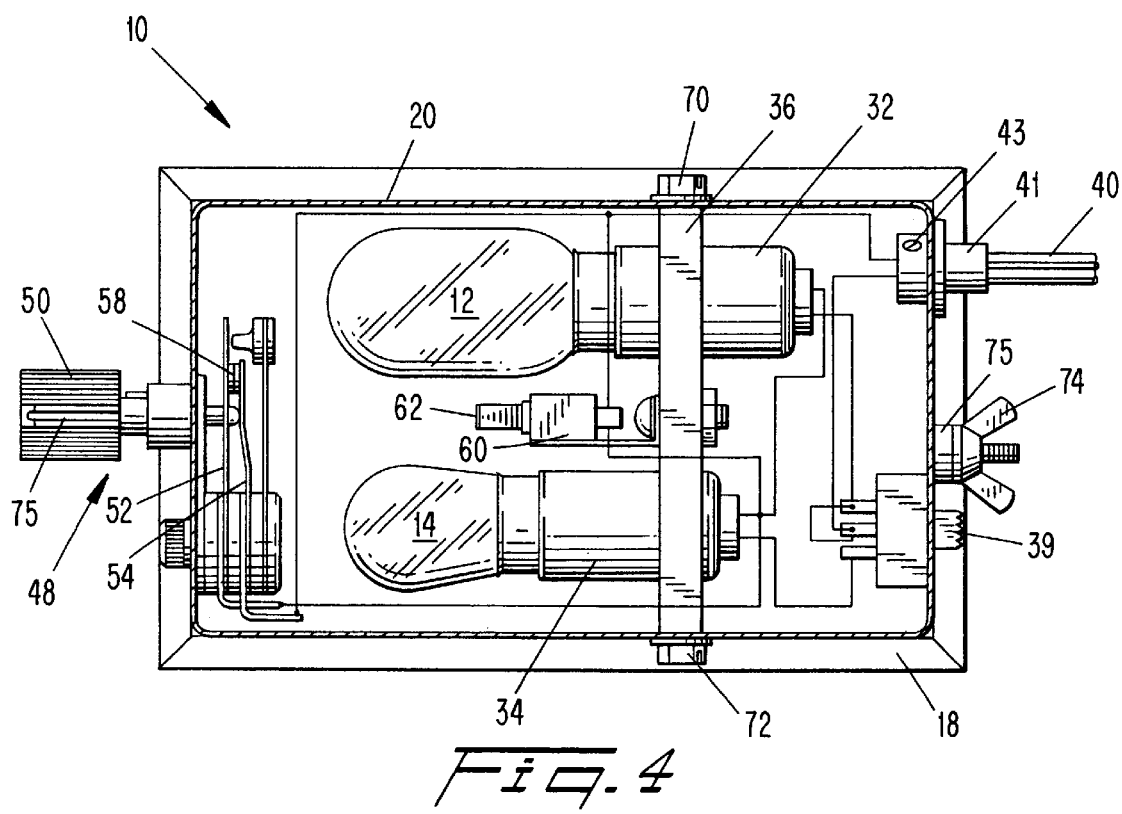

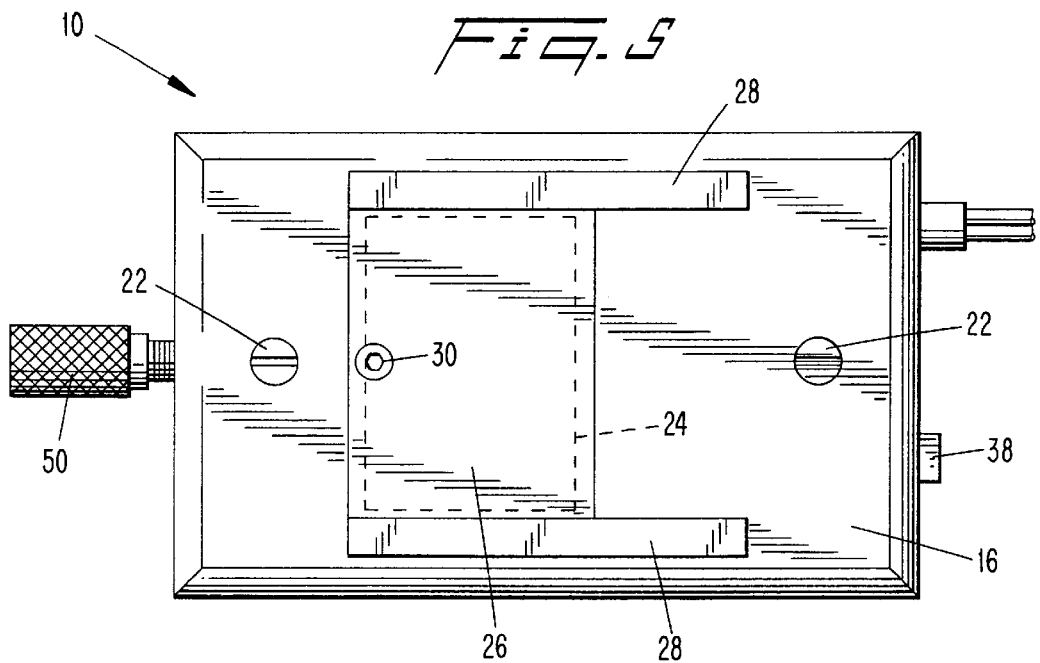
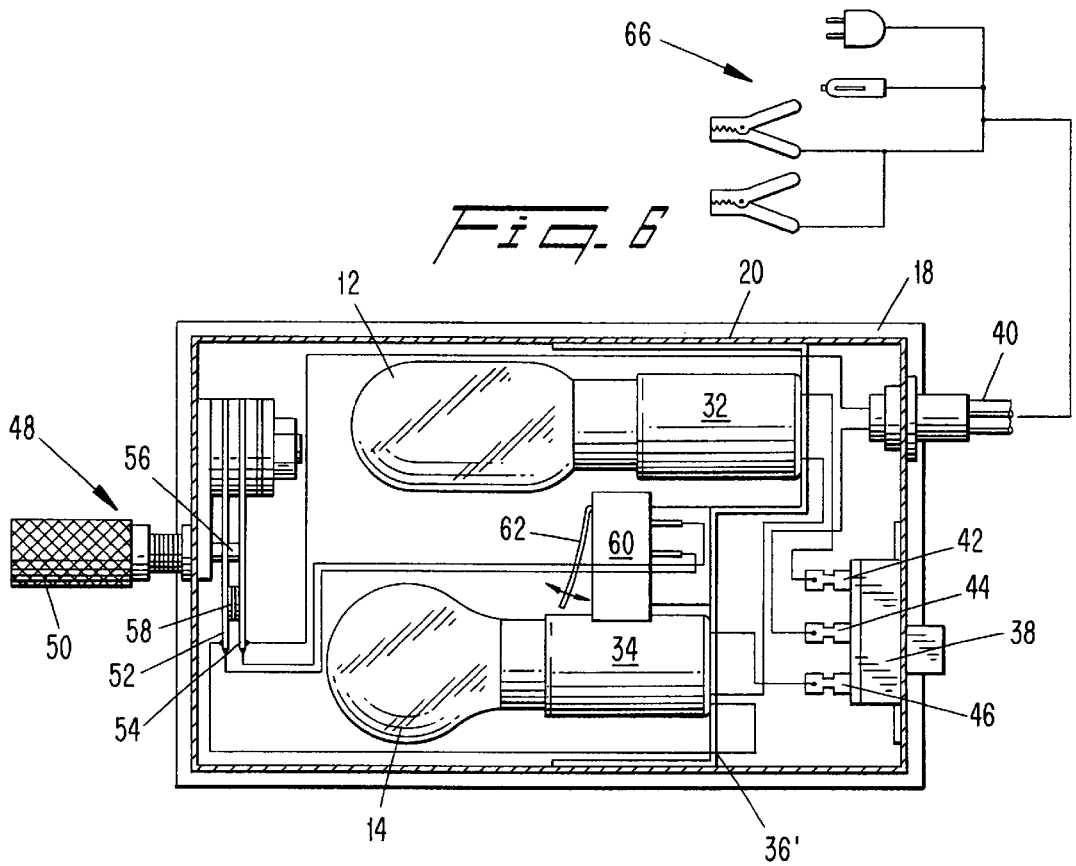

PORTABLE LOW WATTAGE ELECTRIC HEATER

This application is a Continuation-In-Part of U.S. application Ser. No. 08/402,940 filed Mar. 13, 1995.

BACKGROUND OF THE INVENTION

1. Field of the Invention

The present invention relates to a portable resistance heater, and more particularly to a low wattage heater and lamp assembly for use in a wide variety of heating and lighting applications.

2. Description of the Related Art

Portable electric resistance heaters are used in any number of indoor and outdoor applications. Conventional portable resistance heaters such as space heaters include an electric heating element made of a material with a high electrical resistance. Space heaters may also include a fan for circulating air heated by the electric heating element and a thermostat for controlling the temperature of the heater. However, conventional portable heaters are large and cumbersome. They are also expensive to operate because of the amount of electricity used by the heating element and the fan.

There is currently a need for a compact, low powered electric heater which can be used by outdoor workers and sportsmen as both a heater and a lamp. There is also a need for a heater which is adaptable to a variety of power supplies so that it can be used even when there is no electric outlet available.

OBJECTS AND SUMMARY OF THE INVENTION

The present invention meets these needs by providing a low powered, compact, electric heater which can be adapted to be used with different power supplies and can also be used as a lamp. The present invention can be used by outdoor workers, hunters, fishermen, campers, boaters, snowmobilers, other outdoor sportsmen, travelers sleeping in their cars, truck drivers sleeping in their trucks, and outdoor workers.

An electric heater according to a preferred embodiment of the invention includes a housing having a top panel and a bottom panel and at least two removable heating elements mounted within the housing. A connecting means is provided for alternatively connecting the heater to at least two power supplies having different voltages. A first switch connects one or the other of the two heating elements to the connecting means for supplying power, depending on the voltage of the power supply. An adjustable thermostat is provided to turn off the heating elements when said elements reach a predetermined temperature.

BRIEF DESCRIPTION OF THE DRAWING FIGURES

The invention will be described in greater detail with reference to the accompanying drawings in which like elements bear like reference numerals, and wherein:

FIG. 1 is a top view of the electric heater according to a first embodiment of the invention;

FIG. 2 is a front view of the electric heater of FIG. 1;

FIG. 3 is a right side view of the electric heater of FIG. 1;

FIG. 4 is a cross-sectional view of the electric heater of FIG. 1 taken under the cover;

FIG. 5 is a top view of the electric heater according to a second embodiment of the invention;

FIG. 6 is a cross-sectional view of the embodiment of FIG. 5 taken under the cover of the heater;

DETAILED DESCRIPTION

Figure 7:
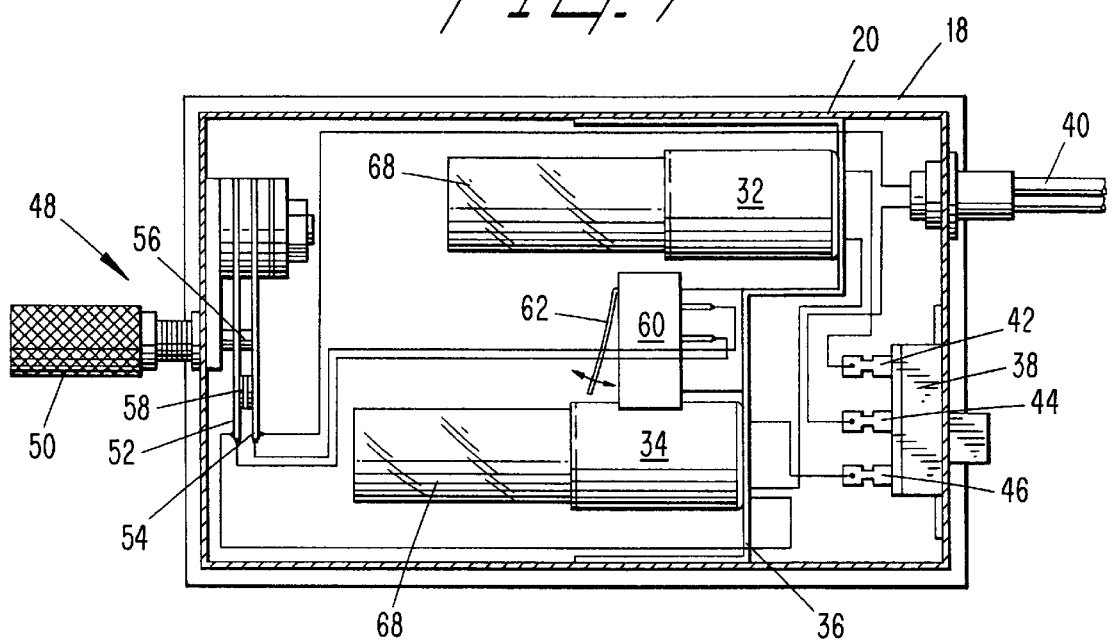
FIG. 7 is a cross-sectional view of a third embodiment of the invention taken under the cover.
Figure 8:
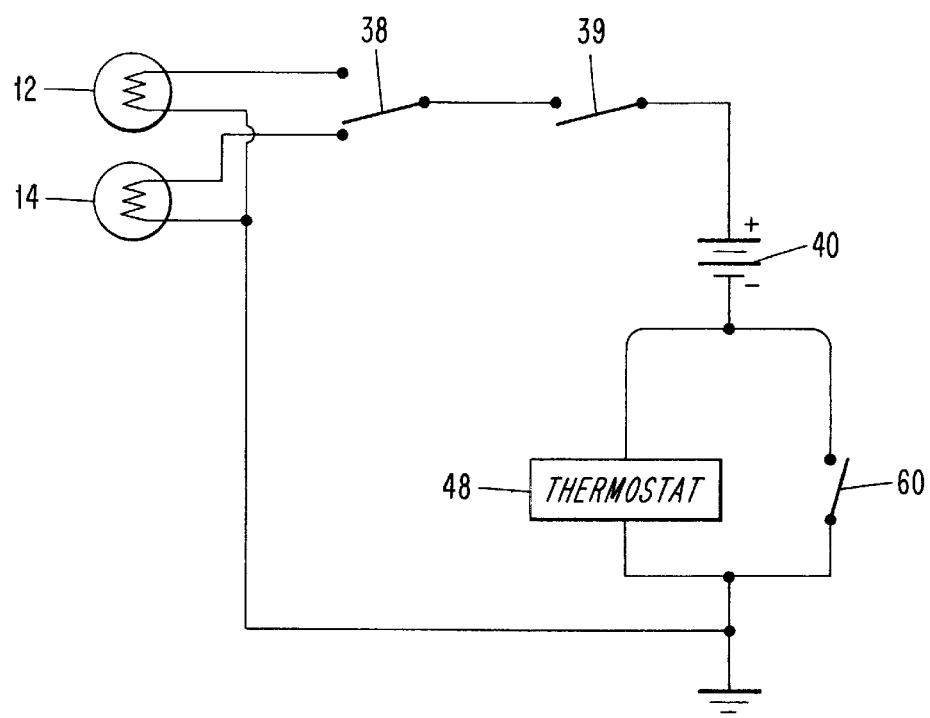
FIG. 8 is a schematic diagram of the embodiment of FIGS. 1–4.

With reference the first embodiment of the present invention illustrated in FIGS. 1–4, the portable electric heater includes a housing 10 containing two electric heating elements 12, 14, which may be in the form of conventional electric light bulbs, positioned within the housing. The housing 10 is preferably provided with a top cover 16, a bottom cover 18 and side walls 20. The top cover 16 is preferably removably mounted, for example, by screws 22 so that the cover may be removed for maintenance. The bottom cover 18 may be either permanently mounted or removable.

The top cover 16 is provided with an opening 24 which is covered by a sliding door 26. A pair of tracks 28 are mounted on the top cover 16 and receive the sliding door 26. The door 26 slides along the tracks 28 between an open position in which the device can be used as both a lamp and a heater and a closed position in which the device is used only as a heater. A stop 30 is provided at an edge of the sliding door 26 and projects into the interior of the housing. The stop 30 strikes the sides of the opening 24 and prevents the door from sliding out from under the tracks 28. The stop 30 may be a screw or any other member which projects from the bottom of the door 26. The stop 30 may also project from the top of the door 26 and can be used as a handle for moving the door. The sliding door 26 allows the heater to be used as a lamp by sliding the door into an open position, thus exposing the heating elements 12, 14. The housing 10 is preferably formed from sheet metal. However, other materials which can withstand the heat of the heating elements without warping or melting may also be used.

Within the housing 10, two different voltage sockets 32, 34 are provided for receiving heating elements 12, 14. The sockets 32, 34 are mounted on a dividing wall 36 which extends from one side of the housing to the other. Two holes are formed in the dividing wall 36 into which the sockets 32, 34 are received. The first socket 32 is preferably adapted to receive a conventional 115 volt bulb or heating element and the second socket 34 is preferably adapted to receive a conventional 12 volt bulb or heating element. In the preferred embodiment of the present invention the heating elements 12, 14 are small commercially available light bulbs having wattages from 25 to 40 watts. The heating elements 12, 14 are subject to burning out after a period of time and may be removed and replaced either through the opening 24 or by removing the top cover 16.

Alternatively, in the embodiment illustrated in FIGS. 1–4, the dividing wall 36 may be mounted in the housing 10 by three screws 70, 71, 72 with two of the screws 70, 71 positioned on the front side of the housing and one screw 72 on the back side of the housing. With this arrangement the lower screw 71 can be removed and the dividing wall 36 including the sockets 32, 34 and the heating elements may be rotated on the two remaining upper screws 70, 72 to allow the heating elements 12, 14 to slide easily into the sockets 32, 34 through the opening 24.

A voltage selection switch 38 is provided which is set to select either 115 volts or 12 volts depending on the available power supply. A second switch 39 which functions as an on/off switch is provided above the voltage selection switch 38. Preferably, the switches 38, 39 are single pole, double throw slide switches, each having three leads. The leads of the voltage selection switch in the embodiment of FIGS. 1–4, cannot be seen in FIG. 4 because they are located directly below the leads of the on/off switch 39.

However, the second embodiment of the present invention which is illustrated in FIGS. 5 and 6 does not include an on/off switch. Therefore, the voltage selection switch 38 can be seen more clearly in the embodiment of FIG. 6. The first lead 42 of the switch 38 is connected to the 115 volt socket 32, the second or middle lead 44 is connected to the power supply 40, and the third lead 46 is connected to the 12 volt socket 34. The switch 38 is manually movable between two positions which alternatively supplies power to the first socket 32 or the second socket 34 depending on the voltage of the power source used. In the two switch embodiment of FIGS. 1–4, the second or middle lead 44 of the voltage selection switch 38 is connected through the on/off switch 39 to the power supply.

The voltage switch 38 is mounted within the housing with a sliding portion extending through a side wall of the housing 10. The side wall of the housing may be marked with 115 V and 12 V, and ON and OFF to indicate the two switch positions of the two switches 38, 39.

Although it is possible to run the 115 volt heating element on a lower voltage power supply such as 12 volts, the 12 volt heating element cannot be run on a higher voltage power supply without causing the heating element to burn out. Therefore, the voltage switch 38 is preferably provided with a lock 74 for preventing inadvertent switching during use which will cause the lower voltage heating element to burn out. The lock 74 includes a plate which is attached to the switch 38 and a wing nut which is tightened to prevent movement of the plate and the switch 38. A washer 75 may be provided under the wing nut which prevents the wing nut from contacting the switch 38 as the wing nut is rotated.

A power supply cord 40 enters the housing 10 through a bushing 41 which attaches the power supply cord 40 securely to the housing. The bushing 41 includes a pair of set screws 43, one of which can be seen in FIG. 4, positioned on opposite sides of the bushing on the inside of the housing. The set screws 43 are tightened on an insulating covering of the power supply cord 40 to hold the cord in place.

Although, the invention has been described as including 115 volt and 12 volt heating elements, it should be understood that other voltage heating elements and power sources may be used. Power may be supplied to the heater from a variety of power sources. When the heater 10 is powered by a 115 volt power source such as household current, the switch 38 is positioned to direct the current to the 115 volt heating element 12. When the heater is powered by a 12 volt source, the switch 38 is positioned in the second position to direct the current to the 12 volt heating element 14.

A fuse (not shown) is preferably provided external to the heater in the power supply cord 40. Alternatively, a fuse may be mounted within the housing 10 of the heater.

The heater according to the first embodiment includes a thermostat 48 which controls the temperature of the heater by turning the heating elements 12, 14 on and off when the heater reaches a predetermined temperature. The simplest form of automatic temperature control uses bimetallic contacts which open and close the circuit to the heating elements 12, 14 in response to temperature. The thermostat 48 has a knob 50 which extends from a side wall of the housing 10 and two bimetallic arms 52, 54. The lower arm 54 is connected to a post 56 which is mounted on the knob 50. The post 56 extends through an opening in the upper arm 52 which is large enough to prevent any contact between the upper arm 52 and the post 56. The lower arm 54 is electrically connected to the power supply and the upper arm 52 is electrically connected to the heating elements.

Contact elements 58 are mounted on the upper and lower bimetallic arms so that the contact elements contact each other to complete the electrical circuit and provide current to the heating elements. When the temperature of the heater increases, the bimetallic arms bend and are moved away from one another, causing the contact elements 58 to move out of contact with one another which turns off the heater. Rotation of the knob 50 moves the lower arm 54 up and down to regulate the temperature at which the thermostat 48 will turn the heater off. The knob 50 preferably has a pointer 75 on an external surface and the side wall of the housing is preferably marked with temperature markings so that the temperature may be set. Although, the thermostat is preferably of the type described above, other small scale thermostats which perform the function of regulating the temperature of the heating elements and preventing the heater from overheating may also be used.

When light bulbs are employed as heating elements 12, 14, the heater can be used as a lamp by opening the sliding door 26 on the top cover 16 of the housing. A screen may also be provided which covers the opening 24 when the sliding door 26 is in an open position. When the sliding door 26 is in the open position, the stop 30 operates to close a thermostat bypass switch 60 by closing a contact lever 62. The bypass switch 60 has two leads which are connected to the lead to the upper and lower arms 52, 54 of the thermostat. When the bypass switch 60 is moved into the closed position by the stop 30, the thermostat is bypassed so that the heating element is not turned on and off when the heater is used as a lamp.

A second embodiment of the present invention is illustrated in FIGS. 5 and 6. The second embodiment includes many of the same elements and features as the first embodiment and the corresponding elements are provided with corresponding reference numerals. According to the second embodiment of the present invention, the sockets 32, 34 are mounted on a dividing wall 36' which extends from one side of the housing to the other. The dividing wall 36' has a stepped shape to accommodate the two sockets 32, 34 of different voltages. The dividing wall 36' of the second embodiment is not movable. In addition, the embodiment of FIGS. 5 and 6 differs from the first embodiment in that the switch 60 is in a different orientation. However, the switch 60 operates in the same manner as the switch of the first embodiment.

The heater according to the second embodiment is preferably provided with an adapter or a set of adapters 66 which allow the heater to be plugged into a household outlet, a car lighter jack, or run directly off a battery. This set of adapters may also be provided for the other embodiments which are disclosed. In addition, the set of adapters may include an on/off switch and a fuse (not shown) which may be provided between the power source and the heater. Alternatively, an on/off switch and a fuse may be mounted within the housing 10 of the heater.

In a third embodiment of the present invention, the heating elements may be wound coil heating cartridges 68, as shown in FIG. 3, such as those disclosed in U.S. Pat. No. 2,831,951, which is incorporated herein by reference. The heating cartridge for use in the present invention includes a helical resistance wire wound on a central core and surrounded by insulating material and a sheath. The heating cartridge is provided with leads which may be adapted to conform to the sockets of the present invention. When heating cartridges are used the sliding door 26 and the bypass switch 60 may be eliminated because the heater will not be used as a lamp. The heating cartridges may be replaced by removing the top cover 16. This third embodiment provides the same advantage of the first and second embodiments of providing a compact heater which may be powered by a variety of power supplies.

The portable heater according to all of the embodiments of the present invention is convenient due to its compact size. The top and bottom covers of the housing are preferably about 2.75 by 4.50 inches and the entire housing is less than 1.50 inches in depth. This small size allows the heater to be easily transported and used in situations where a conventional space heater would be too large such as inside a car or even inside a coat pocket. The fact that the heater can be used as a lamp avoids the necessity of carrying a separate lamp.

While the invention has been described in detail with reference to the specific embodiments thereof, it will be apparent to one skilled in the art that various changes and modification can be made, and equivalents employed, without departing from the spirit and scope of the invention.

What is claimed is:

1. An electric heater comprising:

a housing;

at least two removable heating elements mounted within the housing;

connecting means adapted to connect the heater to at least two electrical power supplies having different voltages;

a first switch connected to the two heating elements and to the connecting means, said switch including means for selectively supplying electrical power to one of the heating elements at a time, depending on the voltage of the power supply connected to the connecting means;

adjustable thermostat for turning off the heating elements when said elements reach a predetermined temperature; and a second switch which bypasses the thermostat.

2. The electric heater of claim 1, wherein the housing has a top panel and further comprising a movable door mounted in the top panel having an open position in which the heater is used as a lamp and in the open position the second switch is activated to bypass the thermostat.

3. The electric heater of claim 2, wherein the movable door has a contacting member which closes the second switch when the movable door is in the open position.

4. The electric heater of claim 1, wherein a top panel of the housing has a movable door and the heater can be used as a light when the door is in an open position.

5. The electric heater of claim 1, wherein the first switch has a first position in which power of a first voltage is provided to a first of the two heating elements and a second position in which power of a second voltage is provided to a second of the two heating elements, wherein the first voltage and the second voltage are different.

6. The electric heater of claim 5, wherein the first switch is positioned at the first position when the source of electric current is 115 volts and positioned at the second position when the source of electric current is 12 volts.

7. The electric heater of claim 6, wherein the first switch in the first position causes the electric current to be directed to a 115 volt heating element and in the second position causes the electric current to be directed to a 12 volt heating element.

8. The electric heater of claim 1, wherein the removable heating elements are positioned in sockets which are adapted to receive both light bulbs and heating cartridges.

9. The electric heater of claim 1, wherein the removable heating elements are light bulbs.

10. The electric heater of claim 1, wherein the removable heating elements are wound coil heating cartridges.

11. The electric heater of claim 1, wherein the connecting means is adapted to connect to a household power supply, a car lighter jack and a battery. time.

12. An electric heater comprising:

a housing;

at least two removable heating elements mounted within the housing;

connecting means adapted to connect the heater to at least two electrical power supplies having different voltages;

a first switch connected to the two heating elements and to the connecting means, said switch including means for selectively supplying electrical power to one of the heating elements at a time, depending on the voltage of the power supply connected to the connecting means;

adjustable thermostat means for turning off the heating elements when said elements reach a predetermined temperature; and wherein the two heating elements are mounted on a plate which is rotated in the housing to allow access to the heating elements.

13. An electric heater comprising:

a housing;

first and second removable heating elements mounted within the housing;

a power supply connector for connecting the heater to first and second electrical power supplies having different voltages;

a first switch connected to the first and second heating elements and to the power supply connector, said first switch selectively supplying electrical power to the first removable heating element from the first electrical power supply and supplying electrical power to the second removable heating element from the second electrical power supply, wherein the first switch supplies power only to one of the first and second heating elements at a time; and, a lock for locking the first switch in a first position or a second position to prevent inadvertent motion of the first switch.

14. The electric heater of claim 13, further comprising an adjustable thermostat which turns off the first and second heating elements when the heating elements reach a predetermined temperature and bypass switch for bypassing the adjustable thermostat so that the heater can be used as a lamp.

15. The electric heater of claim 1, further comprising a lock for locking the first switch in a first position or a second position to prevent inadvertent motion of the first switch.

* * * * *